(12) United States Patent
Miller et al.

(10) Patent No.: US 6,181,912 B1
(45) Date of Patent: Jan. 30, 2001

(54) SYSTEM AND METHOD FOR USER TERMINAL CLOCK ERROR MEASUREMENT AND CORRECTION

(75) Inventors: David S. Miller, Carlsbad; Jeffrey A. Lorbeck, San Diego, both of CA (US)

(73) Assignee: Qualcomm Inc, San Diego, CA (US)

(*) Notice: Under 35 U.S.C. 154(b), the term of this patent shall be extended for 0 days.

(21) Appl. No.: 09/150,499

(22) Filed: Sep. 9, 1998

(51) Int. Cl.$^7$ .................................................. H04B 7/185
(52) U.S. Cl. ........................ 455/12.1; 455/13.2; 455/427; 455/425; 455/424
(58) Field of Search ........................ 455/13.2, 12.1, 455/427, 424, 425, 502, 501, 9, 63; 370/519, 508, 516, 517, 324, 338; 375/372, 371

(56) References Cited

U.S. PATENT DOCUMENTS

| | | | |
|---|---|---|---|
| 3,864,634 | 2/1975 | Dragonetti | 325/419 |
| 5,095,538 | 3/1992 | Durboraw, III | 455/71 |
| 5,463,400 | 10/1995 | Tayloe | 342/352 |
| 5,497,402 | 3/1996 | Pyo et al. | 375/344 |
| 5,566,354 | 10/1996 | Sehloemer | 455/12.1 |
| 5,613,193 | 3/1997 | Ishikawa et al. | 455/12.1 |
| 5,644,572 | 7/1997 | Olds et al. | 370/324 |
| 5,666,648 | 9/1997 | Stuart | 370/321 |
| 5,691,974 | 11/1997 | Zahavi et al. | 370/203 |
| 5,697,051 | 12/1997 | Fawcett | 455/13.2 |
| 5,742,908 | 4/1998 | Dent | 455/517 |
| 5,920,284 | * 7/1999 | Victor | 342/357.01 |
| 5,943,606 | * 8/1999 | Kremm et al. | 455/12.1 |
| 6,078,284 | * 6/2000 | Levanon | 342/357.16 |

FOREIGN PATENT DOCUMENTS

| | | | |
|---|---|---|---|
| 0337269 | 4/1989 | (EP) | H04B/7/26 |
| 0660544 | 6/1995 | (EP) | H04B/7/212 |
| 9608882 | 3/1996 | (WO) | H04B/7/185 |

* cited by examiner

Primary Examiner—Fan Tsang
Assistant Examiner—Marceau Milord
(74) Attorney, Agent, or Firm—Phillip R. Wadsworth; Gregory D. Ogrod

(57) ABSTRACT

A method and apparatus useful for determining the accumulated error in a user terminal dock in a satellite communications system. The satellite communications system includes a gateway, a satellite with a known position and known velocity, and a user terminal having a deskew buffer clocked by a user terminal clock. The method includes the steps of computing the one-way signal delay between the satellite and the user terminal, computing a desired deskew buffer delay based on the computed one-way signal delay and a predetermined maximum value of said one-way signal delay, and computing the accumulated error in the user terminal clock based on the desired deskew buffer delay and the actual deskew buffer delay.

14 Claims, 13 Drawing Sheets

SYSTEM AND METHOD FOR USER TERMINAL CLOCK ERROR MEASUREMENT AND CORRECTION

BACKGROUND OF THE INVENTION

I. Field of the Invention

The present invention relates generally to satellite communication systems, and more particularly, to a method and apparatus for measuring and correcting the error in a user terminal clock.

II. Description of the Related Art

A variety of multiple access communication systems and techniques have been developed for transferring information among a large number of system users. However, spread spectrum modulation techniques, such as code division multiple access (CDMA) spread spectrum techniques, provide significant advantages over other modulation schemes, especially when providing service for a large number of communication system users. The use of CDMA techniques in multiple access communication systems is disclosed in U.S. Pat. No. 4,901,307, which issued Feb. 13, 1990, entitled *Spread Spectrum Multiple Access Communication System Using Satellite Or Terrestrial Repeaters*, and U.S. patent application Ser. No. 08/368,570, entitled *Method And Apparatus For Using Full Spectrum Transmitted Power In A Spread Spectrum Communication System For Tracking Individual Recipient Phase Time And Energy*, both of which are assigned to the assignee of the present invention, and incorporated herein by reference.

These patents disclose communication systems in which a large number of generally mobile or remote system users or subscriber units ("user terminals") employ at least one transceiver to communicate with other user terminals, or users of other connected systems, such as a public telephone switching network. Communication signals are transferred either through satellite repeaters and gateways, or directly to terrestrial base stations (also sometimes referred to as cell-sites or cells).

In a modern satellite communications system, timing is critical. For example, such systems typically divide communications channels into "frames" where each frame is of a known duration. In order to optimize the use of such frames, the gateways or base stations and the user terminals must employ some method to ensure synchronization. Therefore, each user terminal is supplied with a device for providing a timing reference. An ideal time reference would supply the user terminal with a signal of a known frequency.

A local oscillator is often used to provide a timing reference in the user terminal. However, no local oscillator is perfect. Local oscillators are subject to frequency drift. When the frequency of the local oscillator drifts, synchronization is lost.

One approach to minimizing local oscillator frequency drift is to fabricate a more accurate local oscillator. However, such very stable local oscillators are very expensive to fabricate.

Another approach, commonly used in cellular telephone systems, involves the use of a voltage controlled temperature compensated crystal oscillator (VTCXO). The VTCXO is highly resistant to frequency drift caused by temperature changes. In addition, the output frequency of a VTCXO can be controlled by varying an input voltage to the VTCXO.

In such a cellular telephone system, each user terminal is supplied with a VTCXO. Each user terminal monitors a pilot signal transmitted by a base station. The user terminal uses the frequency of the pilot signal as a timing reference to adjust the output frequency of the VTCXO by varying the input voltage applied to it. Such an approach can be used in a cellular telephone system because the relative radial velocities between the base stations and the user terminals are small. However, in some satellite communication systems, such as low-earth orbit (LEO) satellite communication systems, the relative radial velocities between a satellite and a user terminal can be very large. This large relative radial velocity imposes a large Doppler shift on the pilot signal, rendering it unusable as a timing reference.

The Doppler shifts are particularly acute in a LEO satellite system. For example, for a LEO satellite with a velocity of 7 kilometers/second, the Doppler shift seen by a user terminal is approximately 20 parts/million (ppm) at the horizon. For a LEO satellite transmitting at S-band (approximately 2.5 gigahertz) a Doppler shift of 2 ppm translates to a 50 kilohertz frequency shift. Such frequency shifts would render the pilot signal unusable as a timing reference.

SUMMARY OF THE INVENTION

The present invention is directed toward a method and apparatus useful for determining the accumulated error in a user terminal clock in a satellite communications system. The satellite communications system includes a gateway, a satellite with a known position and known velocity, and a user terminal having a deskew buffer clocked by a user terminal clock. The method includes the steps of computing the one-way signal delay between the satellite and the user terminal, computing a desired deskew buffer delay based on the computed one-way signal delay and a predetermined maximum value of said one-way signal delay, and computing the accumulated error in the user terminal dock based on the desired deskew buffer delay and the actual deskew buffer delay.

The one-way signal delay between the satellite and the user terminal is computed based on the round-trip signal delay for signals sent from the gateway to the user terminal and back to the gateway, the actual deskew buffer delay imposed by the deskew buffer on the signals received by the user terminal, and the known position and known velocity of the satellite. The predetermined maximum value of the one-way signal delay is the maximum possible one-way signal delay between the satellite and the user terminal (i.e., when the satellite is near the horizon). The actual deskew buffer delay is calculated based on the number of storage locations intervening between the write pointer and the read pointer for the deskew buffer and either the deskew buffer write interval or the deskew buffer read interval.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

I. Introduction

The present invention is particularly suited for use in communications systems employing low earth orbit (LEO) satellites. However, as would be apparent to one skilled in the relevant art, the concept of the present invention can also be applied to satellite systems that are not utilized for communications purposes. The invention is also applicable to satellite systems in which the satellites travel in non-LEO orbits, or to non-satellite repeater systems.

The preferred embodiment of the invention is discussed in detail below. While specific steps, configurations and arrangements are discussed, it should be understood that this is done for illustrative purposes only. A person skilled in the relevant art will recognize that other steps, configurations and arrangements can be used without departing from the spirit and scope of the present invention. The present invention could find use in a variety of wireless information and communication systems, including those intended for position determination, and satellite and terrestrial cellular telephone systems. A preferred application is in CDMA wireless spread spectrum communication systems for telephone service.

II. A Typical Satellite Communications System

Figure 1:
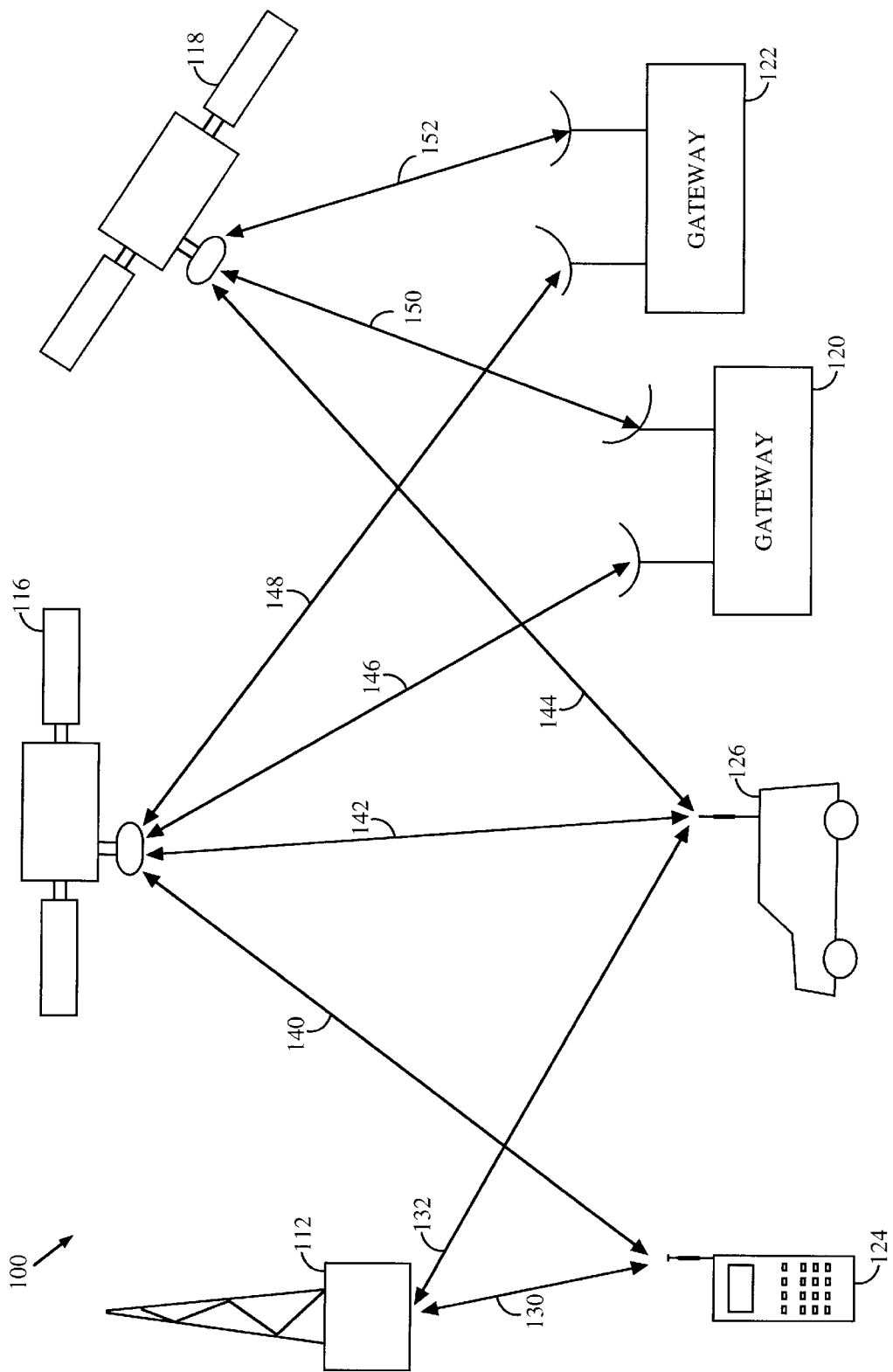
FIG. 1 illustrates an exemplary wireless communication system in which the present invention is useful.

An exemplary wireless communication system in which the present invention is useful is illustrated in FIG. 1. It is contemplated that this communication system uses CDMA type communication signals, but this is not required by the present invention. In a portion of a communication system 100 illustrated in FIG. 1, one base station 112, two satellites 116 and 118, and two associated gateways or hubs 120 and 122 are shown for effecting communications with two remote user terminals 124 and 126. Typically, the base stations and satellites/gateways are components of separate communication systems, referred to as being terrestrial- and satellite-based, although this is not necessary. The total number of base stations, gateways, and satellites in such systems depend on desired system capacity and other factors well understood in the art.

User terminals 124 and 126 each include a wireless communication device such as, but not limited to, a cellular telephone, a data transceiver, or a paging or position determination receiver, and can be hand-held or vehicle-mounted as desired. Here, the user terminals are illustrated as hand-held telephones. However, it is also understood that the teachings of the invention are applicable to fixed units where remote wireless service is desired, including "indoor" as well as "open air" locations.

Generally, beams from satellites 116 and 118 cover different geographical areas in predefined patterns. Beams at different frequencies, also referred to as CDMA channels or "sub-beams," can be directed to overlap the same region. It is also readily understood by those skilled in the art that beam coverage or service areas for multiple satellites, or antenna patterns for multiple base stations, might be designed to overlap completely or partially in a given region depending on the communication system design and the type of service being offered, and whether space diversity is being achieved.

A variety of multi-satellite communication systems have been proposed with an exemplary system employing on the order of 48 or more satellites, traveling in eight different orbital planes in LEO orbits for servicing a large number of user terminals. However, those skilled in the art will readily understand how the teachings of the present invention are applicable to a variety of satellite system and gateway configurations, including other orbital distances and constellations. At the same time, the invention is equally applicable to terrestrial-based systems of various base station configurations.

In FIG. 1, some possible signal paths are illustrated for communications being established between user terminals 124 and 126 and base station 112, or through satellites 116 and 118, with gateways 120 and 122. The base station-user terminal communication links are illustrated by lines 130 and 132. The satellite-user terminal communication links between satellites 116 and 118, and user terminals 124 and 126 are illustrated by lines 140, 142, and 144. The gateway-satellite communication links, between gateways 120 and 122 and satellites 116 and 118, are illustrated by lines 146, 148, 150, and 152. Gateways 120 and 122, and base station 112, may be used as part of one or two-way communication systems or simply to transfer messages or date to user terminals 124 and 126.

Figure 2:
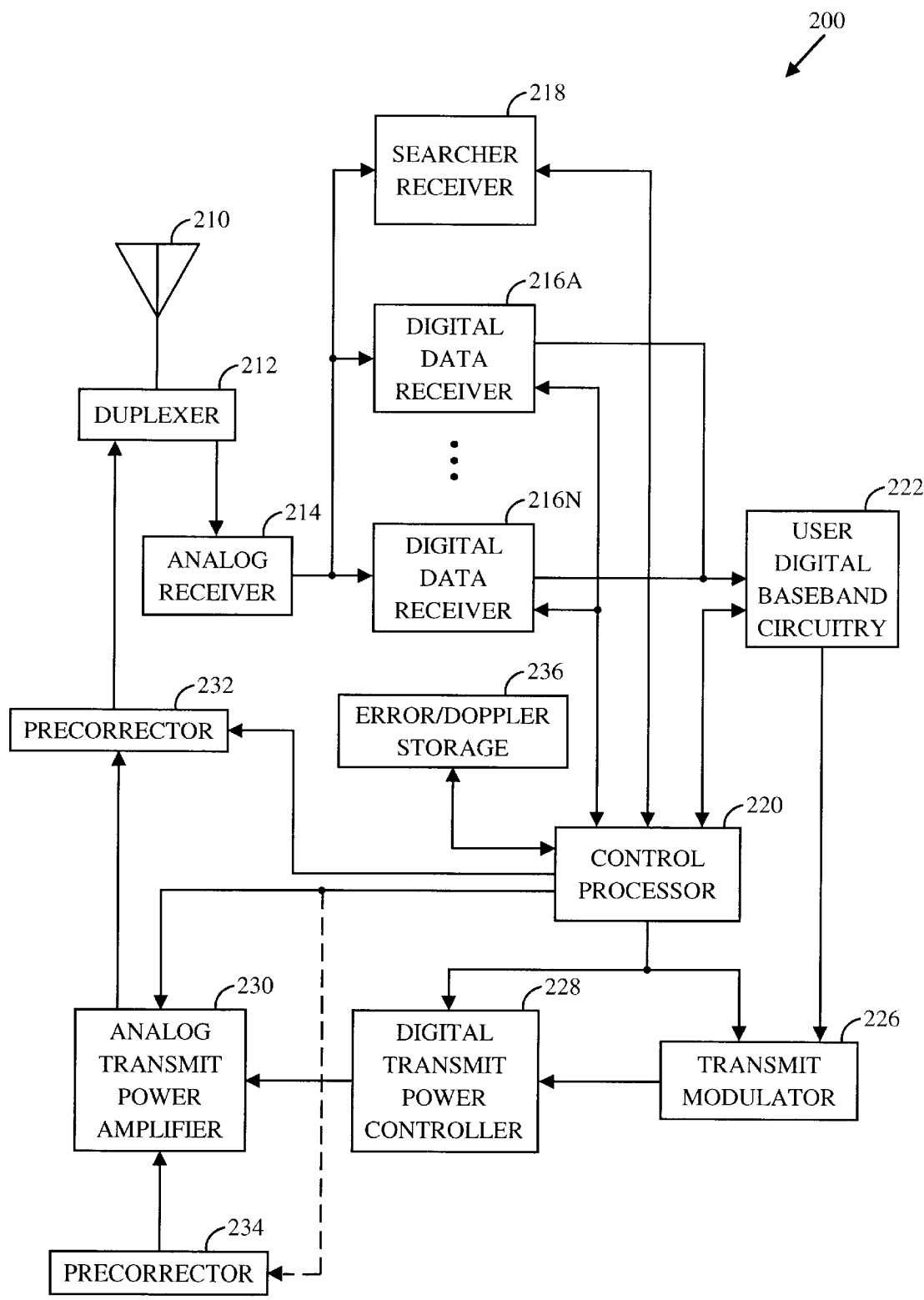
FIG. 2 illustrates an exemplary transceiver for use in a user terminal.

An exemplary transceiver 200 for use in a user terminal 106 is illustrated in FIG. 2. Transceiver 200 uses at least one antenna 210 for receiving communication signals, which are transferred to an analog receiver 214, where they are downconverted, amplified, and digitized. A duplexer element 212 is typically used to allow the same antenna to serve both transmit and receive functions. However, some systems employ separate antennas for operating at different transmit and receive frequencies.

The digital communication signals output by analog receiver 214 are transferred to at least one digital data receiver 216A and at least one searcher receiver 218. Additional digital data receivers 216B–216N can be used to obtain desired levels of signal diversity, depending on the acceptable level of unit complexity, as would be apparent to one skilled in the relevant art.

At least one user terminal control processor 220 is coupled to digital data receivers 216A–216N and searcher receiver 218. Control processor 220 provides, among other functions, basic signal processing, timing, power and handoff control or coordination, and selection of frequency used for signal carriers. Another basic control function often performed by control processor 220 is the selection or manipulation of pseudonoise (PN) code sequences or orthogonal functions to be used for processing communication signal waveforms. Signal processing by control processor 220 can include a determination of relative signal strength and computation of various related signal parameters. Such computations of signal parameters, such as timing and frequency may include the use of additional or separate dedicated circuitry to provide increased efficiency or speed in measurements or improved allocation of control processing resources.

The outputs of digital data receivers 216A–216N are coupled to digital baseband circuitry 222 within the user terminal. User digital baseband circuitry 222 comprises processing and presentation elements used to transfer information to and from a user terminal user. That is, signal or data storage elements, such as transient or long term digital memory; input and output devices such as display screens, speakers, keypad terminals, and handsets; A/D elements, vocoders and other voice and analog signal processing elements; etc., all form parts of the user digital baseband circuitry 222 using elements well known in the art. If diversity signal processing is employed, user digital baseband circuitry 222 can comprise a diversity combiner and decoder. Some of these elements may also operate under the control of, or in communication with, control processor 220.

When voice or other data is prepared as an output message or communications signal originating with the user terminal, user digital baseband circuitry 222 is used to receive, store, process, and otherwise prepare the desired data for transmission. User digital baseband circuitry 222 provides this data to a transmit modulator 226 operating under the control of control processor 220. The output of transmit modulator 226 is transferred to a power controller 228 which provides output power control to a transmit power amplifier 230 for final transmission of the output signal from antenna 210 to a gateway.

User terminal 200 can also employ a precorrection element 232 in the transmission path to adjust the frequency of the outgoing signal. This can be accomplished using well known techniques of up- or down-conversion of the transmission waveform. In the alternative, a precorrection element 232 can form part of a frequency selection or control mechanism for the analog up-conversion and modulation stage (230) of the user terminal so that an appropriately adjusted frequency is used to convert the digital signal to a desired transmission frequency in one step.

User terminal 200 can also employ a precorrection element 232 in the transmission path to adjust the timing of the outgoing signal. This can be accomplished using well known techniques of adding or subtracting delay in the transmission waveform.

Information or data corresponding to one or more measured signal parameters for received communication signals, or one or more shared resource signals, can be sent to the gateway using a variety of techniques known in the art. For example, the information can be transferred as a separate information signal or be appended to other messages prepared by user digital baseband circuitry 222. Alternatively, the information can be inserted as predetermined control bits by transmit modulator 226 or transmit power controller 228 under control of control processor 220.

Digital receivers 216A–N and searcher receiver 218 are configured with signal correlation elements to demodulate and track specific signals. Searcher receiver 218 is used to search for pilot signals, or other relatively fixed pattern strong signals, while digital receivers 216A–N are used to demodulate other signals associated with detected pilot signals. Therefore, the outputs of these units can be monitored to determine the energy in, or frequency of, the pilot signal or other signals. These receivers also employ frequency tracking elements that can be monitored to provide current frequency and timing information to control processor 220 for signals being demodulated.

Control processor 220 uses such information to determine to what extent the received signals are offset from the oscillator frequency, when scaled to the same frequency band, as appropriate. This and other information related to frequency errors and Doppler shifts, as discussed below, can be stored in a storage or memory element 236, as desired.

Figure 3:
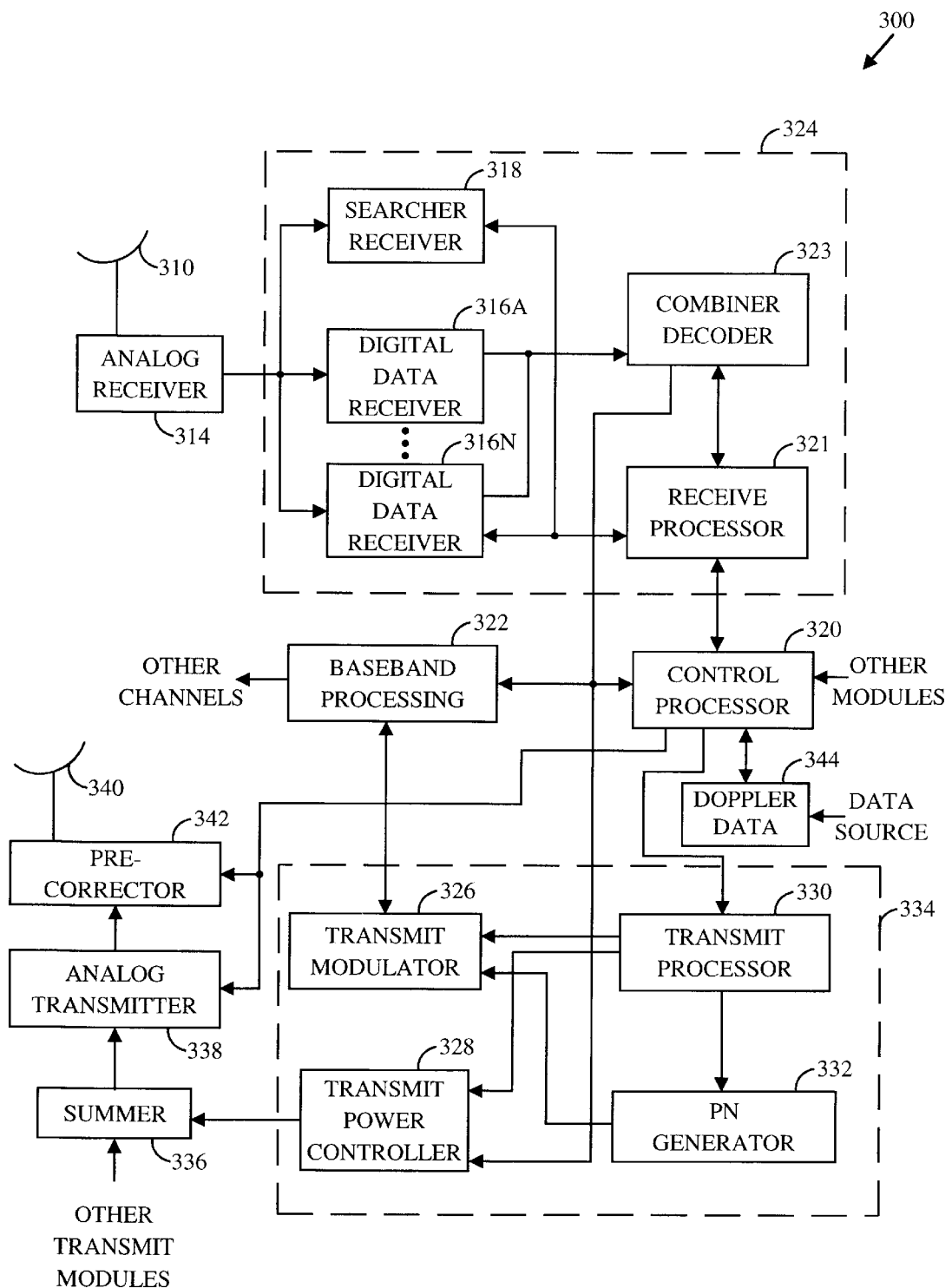
FIG. 3 illustrates an exemplary transmission and reception apparatus for use in a gateway.

An exemplary transmission and reception apparatus 300 for use in gateways 120 and 122 is illustrated in FIG. 3. The portion of gateway 120, 122 illustrated in FIG. 3 has one or more analog receivers 314 connected to an antenna 310 for receiving communication signals which are then downconverted, amplified, and digitized using various schemes well known in the art. Multiple antennas 310 are used in some communication systems. Digitized signals output by analog receiver 314 are provided as inputs to at least one digital receiver module, indicated by dashed lines generally at 324.

Each digital receiver module 324 corresponds to signal processing elements used to manage communications between a gateway 120, 122 and one user terminal 124, 126, although certain variations are known in the art. One analog receiver 314 can provide inputs for many digital receiver modules 324, and a number of such modules are typically used in gateways 102, 122 to accommodate all of the satellite beams and possible diversity mode signals being handled at any given time. Each digital receiver module 324 has one or more digital data receivers 316 and a searcher receiver 318. Searcher receiver 318 generally searches for appropriate diversity modes of signals other than pilot signals. Where implemented in the communication system, multiple digital data receivers 316A–316N are used for diversity signal reception.

The outputs of digital data receivers 316 are provided to subsequent baseband processing elements 322 comprising apparatus well known in the art and not illustrated in further detail here. Exemplary baseband apparatus includes diversity combiners and decoders to combine multipath signals into one output for each subscriber. Exemplary baseband apparatus also includes interface circuits for providing output data, typically to a digital switch or network. A variety of other known elements such as, but not limited to, vocoders, data modems, and digital data switching and storage components may form a part of baseband processing elements 322. These elements operate to control or direct the transfer of data signals to one or more transmit modules 334.

Signals to be transmitted to user terminals are each coupled to one or more appropriate transmit modules 334. A typical gateway uses a number of such transmit modules 334 to provide service to many user terminals 124, 126 at a time, and for several satellites and beams at a time. The number of transmission modules 334 used by gateway 120, 122 is determined by factors well known in the art, including system complexity, number of satellites in view, subscriber capacity, degree of diversity chosen, and the like.

Each transmit module 334 includes a transmit modulator 326 which spread-spectrum modulates data for transmission. Transmit modulator 326 has an output coupled to a digital transmit power controller 328, which controls the transmission power used for the outgoing digital signal. Digital transmit power controller 328 applies a minimum level of power for purposes of interference reduction and resource allocation, but applies appropriate levels of power when needed to compensate for attenuation in the transmission path and other path transfer characteristics. A PN generator 332 is used by transmit modulator 326 in spreading the signals. This code generation can also form a functional part of one or more control processors or storage elements used in gateway 122, 124.

The output of transmit power controller 328 is transferred to a summer 336 where it is summed with the outputs from other transmit modules. Those outputs are signals for transmission to other user terminals 124, 126 at the same frequency and within the same beam as the output of transmit power controller 328. The output of summer 336 is provided to an analog transmitter 338 for digital-to-analog conversion, conversion to the appropriate RF carrier frequency, further amplification and output to one or more antennas 340 for radiating to user terminals 124, 126. Antennas 310 and 340 may be the same antennas depending on the complexity and configuration of the system.

A precorrection element or precorrector 342 can be disposed in the transmission path just after summer 336 and analog transmitter 338. In one embodiment of the present invention, precorrector 342 operates after analog signal formation and amplification to adjust the output frequency as discussed in further detail below. The amount of frequency correction imposed on the outgoing user terminal signal, or forward link, is based on known Doppler between the gateway and each satellite through which communication is established. Techniques or elements used to adjust the frequency of signals prior to transmission are well known in the art.

A single frequency precorrection element can be used because all user terminals communicating with a gateway share the same transmission path from the gateway to the satellite. Alternatively, the output frequency of analog transmitter 338 can be adjusted directly by control processor 320 to provide a shifted output frequency, offset from the normal center frequency.

In another embodiment of the present invention, precorrector 342 operates after analog signal formation and amplification to adjust the output timing as discussed in further detail below. The amount of timing correction imposed on the outgoing user terminal signal, or forward link, is based on known propagation delay and code Doppler between the gateway and each satellite through which communication is established. Techniques or elements used to adjust the timing of signals prior to transmission are also well known in the art.

The amount of shifting in frequency or in time required to account for the satellite Doppler or propagation delay can be computed by control processor 320 using known satellite orbital position data. This data can be stored and retrieved from one or more storage elements 344, such as lookup tables or memory elements A variety of well known devices such as RAM and ROM circuits, or magnetic storage devices can be used to construct storage elements 344. This information is used to establish the frequency or timing adjustments at any given time.

At least one gateway control processor 320 is coupled to receiver modules 324, transmit modules 334, and baseband circuitry 322; these units may be physically separated from each other. Control processor 320 provides command and control signals to effect functions such as, but not limited to, signal processing, timing signal generation, power control, handoff control, diversity combining, and system interfacing. In addition, control processor 320 assigns PN spreading codes, orthogonal code sequences, and specific transmitters and receivers for use in subscriber communications.

Control processor 320 also controls the generation and power of pilot, synchronization, and paging channel signals and their coupling to transmit power controller 328. The pilot channel is simply a signal that is not modulated by data, and may use a constant-value (pattern) or tone-type input to transmit modulator 326, effectively transmitting only the PN spreading codes applied from PN generator 332.

While control processor 320 can be coupled directly to the elements of a module, such as transmit module 324 or receive module 334, each module generally comprises a module-specific processor, such as transmit processor 330 or receive processor 321, which controls the elements of that module. Thus, in a preferred embodiment, control processor 320 is coupled to transmit processor 330 and receive processor 321, as shown in FIG. 3. In this manner a single control processor 320 can control the operations of a large number of modules and resources more efficiently. Transmit processor 330 controls generation of, and signal power for, pilot, synchronization, paging signals, and traffic channel signals, and their respective coupling to power controller 328. Receiver processor 321 controls searching, PN spreading codes for demodulation and monitoring received power.

For certain operations, such as shared resource power control, gateways 120 and 122 receive information such as received signal strength, frequency measurements, or other received signal parameters from user terminals in communication signals. This information can be derived from the demodulated outputs of data receivers 316 by receive processors 321. Alternatively, this information can be detected as occurring at predefined locations in the signals being monitored by control processor 320, or receive processors 321, and transferred to control processor 320. Control processor 320 uses this information to control the timing and frequency of signals being transmitted and processed using transmit power controllers 328 and analog transmitter 338.

The preferred embodiment of the invention is discussed in detail below. While specific steps, configurations and arrangements are discussed, it should be understood that this is done for illustrative purposes only. A person skilled in the relevant art will recognize that other steps, configurations and arrangements can be used without departing from the spirit and scope of the present invention. The present invention could find use in a variety of wireless information and communication systems, including those intended for position determination, and satellite and terrestrial cellular telephone systems.

III. Deskew Buffers

In a typical wireless communications system, such as the one described above, a transmitted signal is sometimes reflected by obstructions and atmospheric phenomena en route to a receiver, resulting in several signals traveling over different paths to the receiver. In a preferred embodiment, the user terminal employs diversity signal combining. That is, the user terminal combines the different versions of a signal received along different paths to improve the quality of the received signal. These signal versions, which may include signals transmitted from different sources, as well as reflections of a signal transmitted from the same source, are often referred to as "diversity signals."

Referring to FIG. 2, each diversity signal is processed by a different digital data receiver 216. However, the diversity signals travel along paths of different lengths. Therefore, the diversity signals may not be time-aligned with respect to each other when they leave digital data receivers 216. But for diversity signal combining to be effective, these signals must be time-aligned when they are combined. To impose time alignment on diversity signals processed by digital data receivers 216, the user terminal employs a "deskew buffer" for each finger of the diversity receiver. A deskew buffer imposes a variable delay on the signal output by a digital data receiver 216 prior to combining with other diversity signals.

Figure 4:
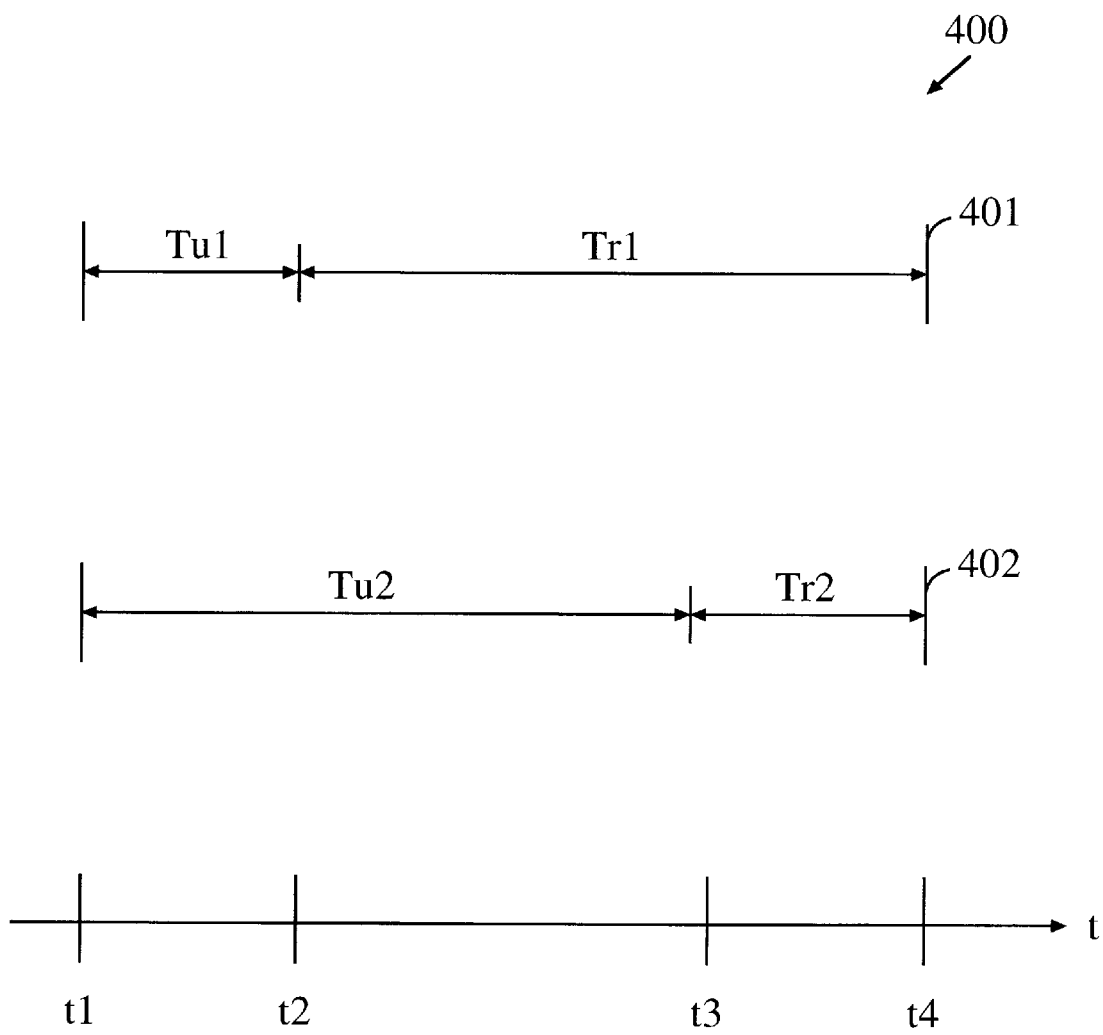
FIG. 4 presents two timelines that are used to illustrate an example use of deskew buffers to impose time alignment on two diversity signals.

FIG. 4 presents two timelines that are used in this document to illustrate an example use of deskew buffers to impose time alignment on two diversity signals. In FIG. 4, $T_u$ represents the time required for a signal to travel from a satellite to a user terminal and $T_r$ represents the delay imposed on a signal by a deskew buffer. Timeline 401 represents these quantities for a first satellite, and timeline 402 represents these quantities for a second satellite.

In this example, both signals are transmitted at the same time, $t_1$. Also in this example, the first satellite is assumed to be somewhere near zenith, and the second satellite is assumed to be somewhere near the horizon. Therefore, assuming LEO satellites, the distance between the user terminal and the first satellite is small compared to the distance between the user terminal and the second satellite. Accordingly, the time $T_{u1}$ required for the signal transmitted by the first satellite to reach the user terminal is significantly less than the time $T_{u2}$ required for the signal transmitted by the second satellite to reach the user terminal. Therefore, referring to FIG. 4, the signal transmitted by the first satellite is received at the user terminal at time $t_2$, while the signal transmitted by the second satellite is received at the user terminal at time $t_3$. Thus, to impose time alignment upon the signals transmitted by the first and second satellites, the deskew buffer compensates for the difference $t_3-t_2$ in their arrival times at the user terminal. In the example of FIG. 4, this is accomplished by using a first deskew buffer to impose a delay $T_{r1}$ on the signal received from the first satellite and using a second deskew buffer to impose a delay $T_{r2}$ on the signal received from the second satellite. $T_{r1}$ and $T_{r2}$ are chosen so that:

$$T_{r1}-T_{r2}=T_{u2}-T_{u1} \quad (1)$$

Therefore, when the two signals leave their respective deskew buffers at time $t_4$, they are in time alignment.

Figure 5:
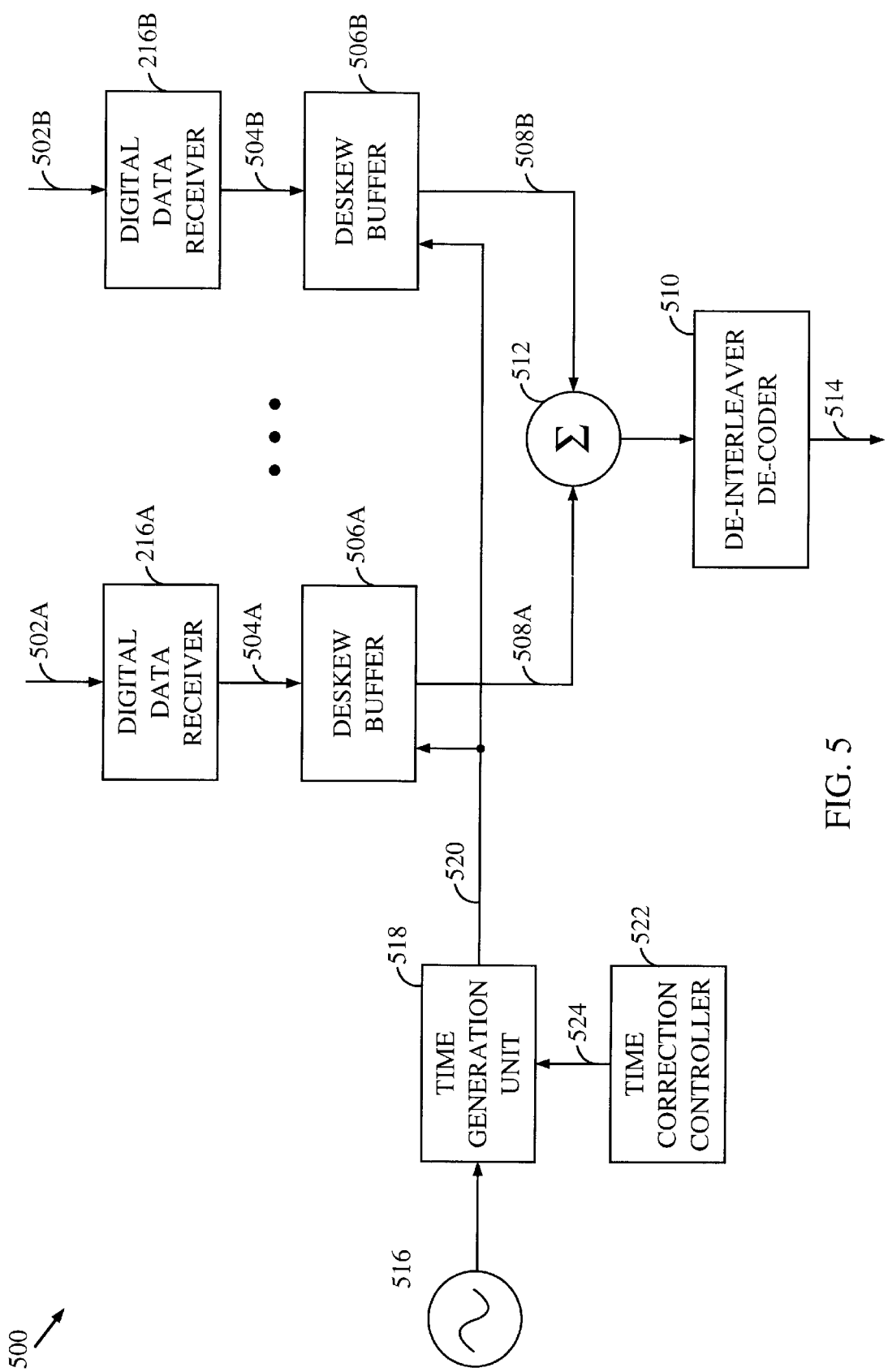
FIG. 5 depicts a portion of the architecture of a user terminal transceiver according to a preferred embodiment.

FIG. 5 depicts a portion of the architecture of user terminal transceiver 200 according to a preferred embodiment. FIG. 5 depicts two digital data receivers 216A,B, their respective deskew buffers 506A,B and a de-interleaver and de-coder 510. FIG. 5 also depicts a combiner 512 and a time source, which includes local oscillator 516, time generation unit 518, and time correction controller 522.

Referring to the example of FIG. 4, digital data receiver 216A receives the signal 502A transmitted by the first satellite and digital data receiver 216B receives the signal 502B transmitted by the second satellite. Deskew buffer 506A imposes time delay $T_{r1}$ on the first signal and deskew buffer 506B imposes delay $T_{r2}$ on the second signal. The resulting signals 508A,B are thus time-aligned. Signals 508A,B are combined by combiner 512, and then de-interleaved and de-coded by unit 510 to produce signal 514. Signal 514 then can be further processed by vocoders and the like to extract its content.

The timing reference for the user terminal is provided by local oscillator 516. In a preferred embodiment, the output frequency of local oscillator 516 is approximately 19.68 megahertz. Time generation unit 518 provides time corrections to the local oscillator signal to generate the user terminal clock signal 520. User terminal clock signal 520 is used to clock deskew buffers 506A,B.

In a preferred embodiment, time generation unit 518 multiplies the frequency of the signal output by local oscillator 516 by 512 and divides that frequency by 1,025 to achieve a signal with a nominal frequency of 9.8304 megahertz. This frequency is eight times the chip rate of the satellite communications system, in a preferred embodiment. Other values can be employed without departing from the spirit and scope of the present invention.

Finally, time generation unit 518 divides this frequency by 8 to achieve the nominal user terminal clock signal 520. As discussed below, time generation unit 518 can divide by other integers to modify the frequency of user terminal clock 520 in response to commands from time correction controller 522.

In a preferred embodiment, deskew buffers 506A,B are part of a single physical circular buffer. The circular buffer is partitioned to provide a separate logical deskew buffer for each finger of the diversity receiver. In a preferred embodiment, units 506, 510, 518 and 522 reside within user digital baseband circuitry 222. In an alternative embodiment, a portion of these units reside within control processor 220. Other alternatives are possible without departing from the spirit and scope of the present invention.

Figure 6:
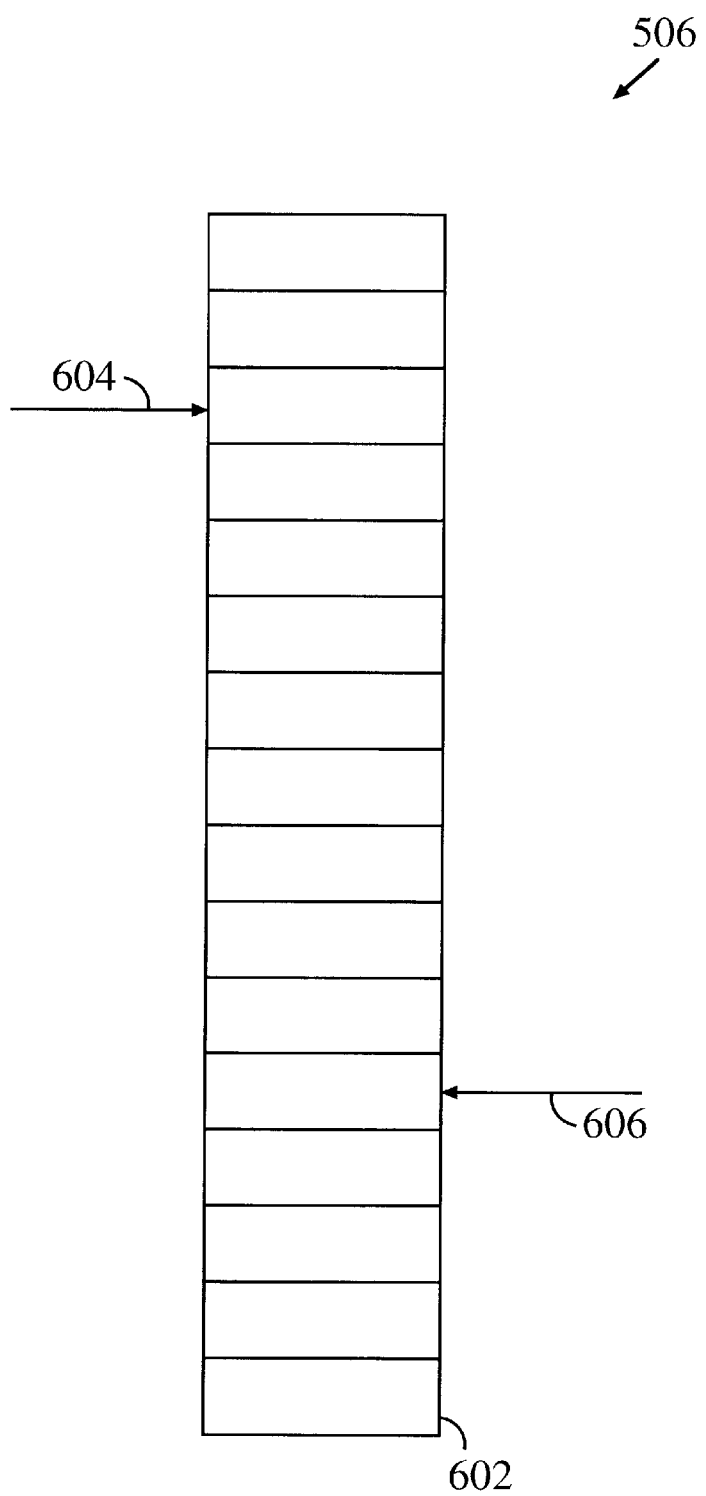
FIG. 6 depicts a portion of a deskew buffer.

FIG. 6 depicts a portion of a deskew buffer 506 according to a preferred embodiment. Deskew buffer 506 includes a plurality of storage locations 602. Digital data words 604 received from digital data receiver 216 are written sequentially into storage locations 602 in deskew buffer 506. In FIG. 6, these words are written sequentially from bottom to top. A predetermined time later, digital data words 604 are read out of deskew buffer 506 sequentially. The difference between the time at which a digital data word 604 is written into the deskew buffer 506 and the time at which that digital data word is read out of deskew buffer 506 is the delay time $T_r$ imposed by the deskew buffer on the signal.

FIG. 6 depicts two deskew buffer pointers: write pointer 604 and read pointer 606. Write pointer 604 indicates the storage location 602 that is currently being written to, and read pointer 606 indicates the storage location that is currently being read from. The rate of advancement of write pointer 604 is controlled by the data rate at which data is received by digital data receiver 216, which is controlled by the gateway clock. The rate of advancement of read pointer 606 is controlled by the user terminal clock.

In nominal operation (i.e., when the gateway and user terminal clocks are synchronized), write pointer 604 and read pointer 606 advance along the deskew buffer in unison. Referring to FIG. 6, this advancement is from bottom to top. As would be apparent to one skilled in the relevant art, the actual deskew buffer delay can be computed based on the write interval or the read interval and the number of storage locations 602 intervening between write pointer 604 and read pointer 606.

When the frequency of the local oscillator deviates from nominal, the user terminal clock deviates from nominal. When the user terminal clock deviates from nominal, it also deviates from the gateway clock. When this happens, write pointer 604 and read pointer 606 do not advance in unison. If the frequency of the user terminal clock is lower than the frequency of the gateway clock, the reads are performed slower than the writes, so that the amount of data in the deskew buffer grows until eventually the buffer overflows. Alternatively, if the frequency of the user terminal clock is greater than the frequency of the gateway clock, the reads are performed faster than the writes, until eventually the user terminal will try to read data before it is even written.

IV. User Terminal Clock Error Detection

The first step in correcting the error in the user terminal clock is to measure the error. In a preferred embodiment, successive measurements of the round-trip delay encountered by a signal transmitted from the gateway to the user terminal and back are used to determine the user terminal clock error.

In a preferred embodiment of the present invention, both the received signal and the transmitted signal are divided into frames. Because the user terminal transmitter and receiver are both synchronized to the same internal time reference, there is a constant time delay between the time at which a frame boundary is received by the user terminal, and the time at which a corresponding frame boundary is transmitted by the user terminal. Therefore, let:

$T_s$=delay between gateway and satellite;

$T_d$=delay between received frame boundary and transmitted frame boundary;

$T_u$=delay between user terminal and satellite;

$T_r$=actual delay imposed by deskew buffer; and $T_m$=maximum possible value of $T_u$.

In a preferred embodiment, the user terminal maintain s the sum $T_u+T_r$ constant and equal to $T_m$. Therefore, the total round-trip delay between the transmission of a frame boundary at the gateway transmitter and the receipt of a corresponding frame boundary at the gateway receiver is given by $$T_{RTD}=T_s+T_u+T_r+T_d+T_u+T_s \quad (2)$$

In a preferred embodiment, the user terminal periodically reports the value $T_r$ to the gateway. In addition, the gateway periodically measures $T_{RTD}$ and solves the above equation for $T_u$.

$$T_u=(T_{RTD}-T_r-T_d)/2-T_s \quad (3)$$

In a preferred embodiment, the gateway measures $T_{RTD}$ every few minutes. The gateway reports $T_u$ the user terminal. The user terminal then solves for the desired delay $T_r'$ to be imposed by the deskew buffer.

$$T_r'=T_m-T_u \quad (4)$$

The accumulated error in the user terminal clock since the last report of $T_r$ is then given by $$x_{RTD}=T_r'-T_r \quad (5)$$

In a preferred embodiment of the present invention, $T_{RTD}$ is measured by the following method. First, a signal containing a known running PN sequence or spreading code is transmitted by the gateway. The signal is relayed to the user terminal by the satellite. The user terminal retransmits the signal either immediately or after a known delay. The retransmitted signal is relayed back to the gateway by the same satellite. The gateway then compares the state of the PN sequence in the received signal to the state of the local PN sequence. The difference in states is then used to determine the total round-trip delay, which includes known delays between the gateway and the satellite. These delays are known because the distance between the satellite and the gateway is maintained by the gateway, as is well known in the relevant art. Subtracting these known delays from the total round-trip delay yields $T_{RTD}$. Using known satellite ephemerides, the known delays between the gateway and the satellite are computed by various methods well known in the art.

V. User Terminal Clock Error Correction

Figure 7:
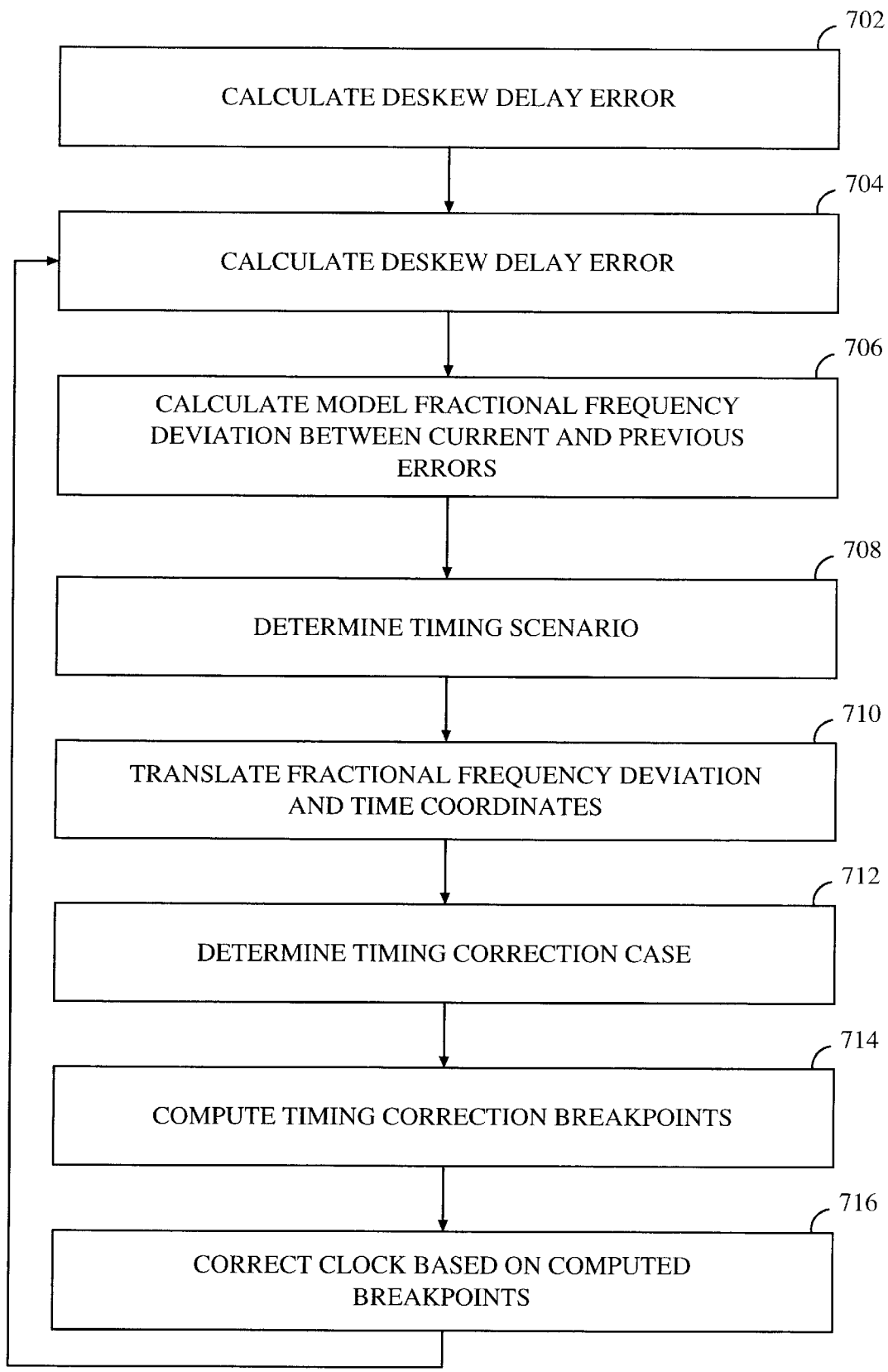
FIG. 7 is a flowchart depicting the operation of the present invention in correcting a user terminal clock error using a deskew delay error measurement according to a preferred embodiment of the present invention.

FIG. 7 is a flowchart depicting the operation of the present invention in correcting the user terminal clock error using the deskew delay error measurement described above, according to a preferred embodiment of the present invention. Referring to FIG. 7, in steps 702 and 704, two successive deskew delay errors are calculated based on two successive measurements of $T_{RTD}$. In step 706 the model fractional frequency deviation of the user terminal clock is calculated based on the current and previous deskew delay errors. When the user terminal is first activated, the previous deskew delay error is that calculated in step 702 and the current deskew delay error is that calculated in step 704. For subsequent measurements, the current and previous deskew delay errors are found by successive passes through step 704.

The user terminal clock may be found to be running "too fast" or "too slow." In addition the user terminal clock may be found to be running "ahead" or "behind." Thus, the user terminal clock falls within one of four timing scenarios, based on these two factors. In a step 708, the proper timing scenario is determined. The inventors have found that each timing scenario resolves into one of six timing correction cases. Each timing correction case can be handled in the same manner for each of the four timing scenarios after a proper coordinate translation. Therefore, in a step 710, the fractional frequency deviation and time coordinates are translated, and in a step 712, the proper timing case is determined.

Each timing case is defined by two or three timing correction break points, as described in detail below. Once these break points are calculated, the user terminal clock error can be corrected based on the timing case and the computed break points. Therefore, in a step 714, the timing correction break points for the selected timing case are computed. Then, in a step 716, the user terminal clock error is corrected based on the computed break points.

The calculation of the deskew delay error, which corresponds to steps 702 and 704 was discussed above. Now, the calculation of the model fractional frequency deviation is discussed in detail. This operation corresponds to step 706. The fractional frequency deviation of the user terminal clock varies between $T_{RTD}$ measurements, as would be apparent to one skilled in the relevant art. The inventors have found that the operation of the present invention can be simplified by modeling the fractional frequency delay. The inventors have found that the variation between the instantaneous and model fractional frequency deviations are insignificant for the purposes of correcting the user terminal clock error. This model assumes that the oscillator frequency deviation is constant over the interval, although the actual frequency deviation may change instantaneously. The fractional frequency delay over the n-th $T_{RTD}$ measurement interval is therefore modeled according to $$y_{mod,n} = \frac{x_{RTD}(t_{n+1}) - x_{RTD}(t_n)}{t_{n+1} - t_n} \quad (6)$$

Figure 8A:
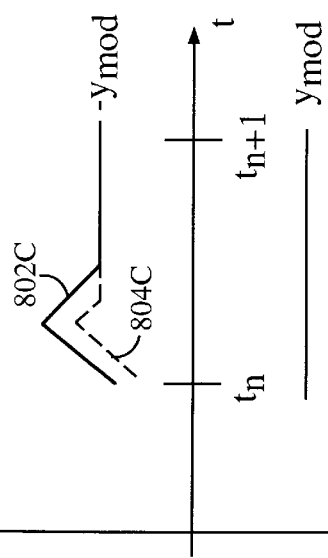
FIGS. 8A, B, C, and D graphically depict four timing error scenarios.
Figure 8B:
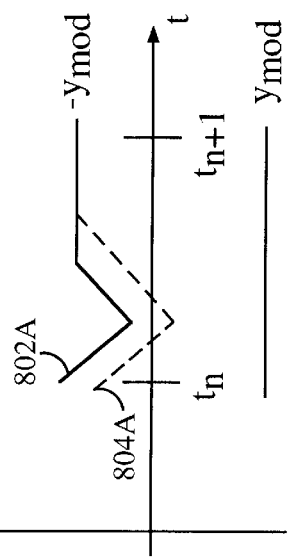
Figure 8C:
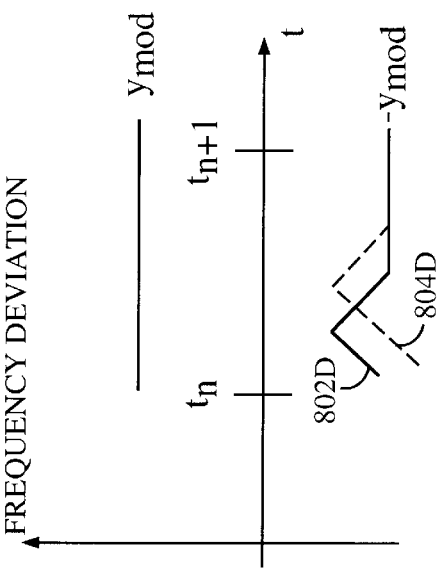
Figure 8D:
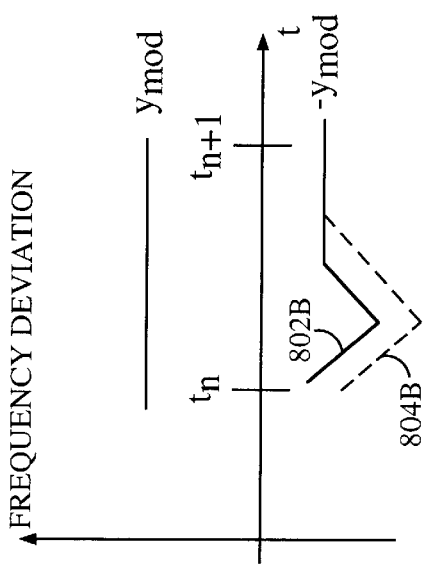

The present invention uses the most recent model frequency deviation to predict future user terminal clock performance. As discussed above, the modeled clock performance over an interval falls into one of four timing scenarios. These four scenarios are depicted graphically in FIGS. 8A, B, C, D. FIG. 8A depicts the case where the user terminal clock is running "ahead" and too slowly (i.e., $x_{RTD}>0$ and $y_{mod}<0$). FIG. 8B depicts the case where the user terminal clock is ahead but running too fast (i.e., $x_{RTD}>0$ and $y_{mod}<0$). FIG. 8C depicts the case where the user terminal clock is running "behind" and too slowly (i.e., $x_{RTD}<0$ and $y_{mod}<0$). FIG. 8D depicts the timing scenario where the user terminal clock is running behind and too fast (i.e., $x_{RTD}<0$ and $y_{mod}>0$).

Each scenario is depicted by a graph of frequency deviation y versus time t, and considers the interval between two deskew delay error calculations: one at time $t_n$ and one at time $t_{n+1}$. For convenience, each graph depicts the model fractional frequency deviation $y_{mod}$ over the interval, and its inverse, as horizontal lines on the graph. Each graph also depicts two alternative possibilities. In one possibility, the slew rate at $t_n$ exceeds the inverse of $y_{mod}$. This possibility is depicted by solid lines. In the other possibility, the slew rate at $t_n$ is less than the inverse of $y_{mod}$. This possibility is depicted by dashed lines.

A useful analogy in understanding the four scenarios presented in FIG. 8 is that of two cars moving along a highway in the same direction. In this analogy, one of the cars is a "pace car" that moves at a preset ideal speed. The pace car represents the desired clock timing. Another car is moving along the highway near the pace car at a slightly different speed. This car, called a "race car" represents the timing of the user terminal clock. The race car is either ahead of or behind the pace car, and is either moving faster than or slower than the pace car.

In a preferred embodiment, an additional constraint is imposed upon the race car. The race car can decelerate at only one particular predetermined rate of deceleration, and can only accelerate at one predetermined rate of acceleration. In a preferred embodiment of the present invention, these rates are equivalent, but of opposite sign. Thus, the pace car has only three rates of acceleration: a predetermined positive rate, a predetermined negative rate, and zero. This constraint represents the constraint imposed upon the slew rate of the user terminal clock ($y_{slew}$). In alternative embodiments, this constraint is not imposed.

In FIG. 8A, the race car is ahead of the pace car and traveling too slowly. Thus, the pace car is gradually catching up with the race car. One objective of the present invention is to close the gap between the pace car and the race car as quickly as possible. Therefore, the race car slows rapidly and then accelerates rapidly to close the gap as quickly as possible, so that when the gap has been closed, the race car and pace car are moving at the same rate.

The gap between the race car and pace car represents the time error of the user terminal clock. The difference in speeds of the race car and pace car represents the fractional frequency deviation of the user terminal clock. In FIG. 8B, the race car is ahead of the pace car, and is traveling faster than the pace car. Therefore, the race car is gradually pulling away from the pace car. As in FIG. 8A, the race car must decelerate rapidly and then accelerate rapidly to close the gap with the pace car as quickly as possible, so that the two cars are traveling at the same speed when the gap is closed.

In FIG. 8C, the race car is behind the pace car, and is traveling slower than the pace car. Therefore, the pace car is gradually pulling ahead of the race car. In FIG. 8D, the race car is behind the pace car, but is traveling faster than the pace car. Therefore, the race car is gaining on the pace car. In both FIGS. 8C and 8D, the race car accelerates rapidly, then decelerates, to close the gap between the cars as quickly as possible, while ensuring that the two cars are traveling at the same speed when the gap is closed.

As discussed above, each of the timing scenarios depicted in FIG. 8 resolves into one of six timing correction cases. These six timing cases are depicted in FIGS. 9A–F, and are discussed in further detail below. Before selecting the proper timing correction case, the fractional frequency deviation and time coordinates of the timing scenario are translated. This operation corresponds to step 710 in FIG. 7. This is accomplished by translating the origin of the appropriate timing scenario graph in FIG. 8 to the point ($t_n$, $y_{slew}$).

After an initial period of slewing to remove the time error $x_{RTD}$, the user terminal slews by the negative of the oscillator fractional frequency deviation $y_{mod}$ to counteract the fractioned frequency deviation of the user terminal clock. In the transformed coordinates, the final slew value is given as $$-\hat{y}_{mod} = -y_{mod} - y_{slew}(t_n) \quad (7)$$

VI. Timing Correction Cases

FIGS. 9A–F present the six time correction cases for the timing scenario of FIG. 8. Each timing correction case is depicted as a graph of translated time versus translated frequency deviation, shown as axes 906 and 902, respectively. Each graph also includes a dashed line 904 representing the desired final translated frequency deviation ($-\hat{y}_{mod}$). Due to the translation described above, the user terminal clock begins at the origin of each graph. To correct the user terminal clock, its frequency is slewed at the maximum slew rate $\dot{y}_{max}$ that the shaded area between line 908 and line 904 represents the desired time correction. Line 908 represents the translated frequency of the user terminal clock. As described above, the timing correction cases are related to a particular timing scenario by a coordinate transformation, as described below.

In the timing scenario of FIGS. 8C and 8D, $x_{RTD}$ is negative. Where $x_{RTD}$ is negative, the actual deskew buffer delay exceeds the desired deskew buffer delay. Therefore the user terminal clock is running behind the desired user terminal clock. Where $x_{RTD}$ is negative, the coordinates of the timing scenario are transformed according to equations (8).

$$\hat{y}_{slew}(t) = y_{slew}(t_n) - y_{slew}(t_n)$$

$$\hat{x}_{RTD} = -x_{RTD}$$

$$\hat{y}_{mod} = y_{mod} + y_{slew}(t_n)$$

$$\hat{y}_{max} = y_{max} - y_{slew}(t_n)$$

$$\hat{y}_{max} = -(y_{min} + y_{slew}(t_n)) \quad (8)$$

In FIGS. 8A and 8B, $x_{RTD}$ is positive. Where $x_{RTD}$ is positive, the desired deskew buffer delay exceeds the actual deskew buffer delay. Therefore the user terminal clock is running ahead of the desired user terminal clock. Where $x_{RTD}$ is positive, the coordinates of the timing scenario are transformed according to equations (9).

$$\hat{y}_{slew}(t) = -(y_{slew}(t) - y_{slew}(t_n))$$

$$\hat{x}_{RTD} = x_{RTD}$$

$$\hat{y}_{mod} = -(y_{mod} + y_{slew}(t_n))$$

$$\hat{y}_{max} = y_{max} + y_{slew}(t_n)$$

$$\hat{y}_{min} = y_{slew}(t_n) - y_{max} \quad (9)$$

Figure 9A:
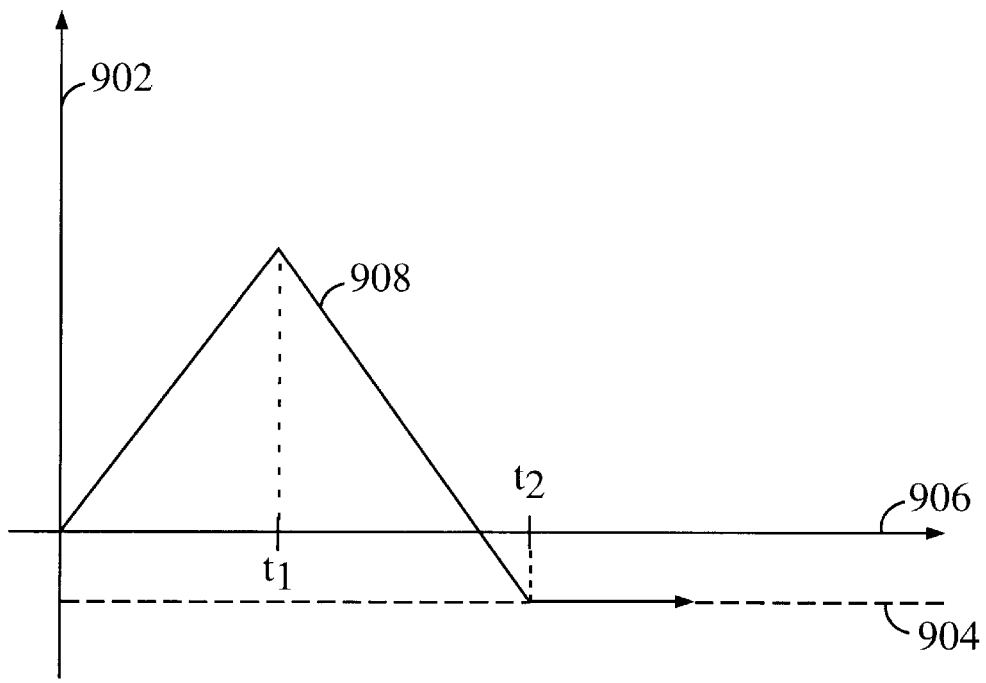
FIGS. 9A, B, C, D, E and F graphically depict six timing correction cases.

Each timing correction case is now described. In FIG. 9A, the user terminal clock frequency is slewed first positively at a rate $\dot{y}_{pos}$ until time $t_1$, and then negatively at a rate $\dot{y}_{neg}$ until time $t_2$. In a preferred embodiment, $\dot{y}_{pos} = \dot{y}_{neg} = \dot{y}_{max}$. At time $t_2$ the user terminal clock has reached the desired final frequency deviation 904. The curve presented by FIG. 9A can be completely characterized by the slew rate $y_{slew}$ and the break points $t_1$ and $t_2$. These break points are given by the following equations:

$$t_1 = \frac{1}{\dot{y}_{max}}\left(\hat{y}_{mod} + \sqrt{\frac{\hat{y}_{mod}^2}{2} - \hat{x}_{RTD}\dot{y}_{max}}\right) \quad (10)$$

$$t_2 = t_1 + \frac{1}{\dot{y}_{max}}\sqrt{\frac{\hat{y}_{mod}^2}{2} - \hat{x}_{RTD}\dot{y}_{max}} \quad (11)$$

-continued $$\hat{y}_{slew}(t) = \begin{cases} -\dot{y}_{max}t, & 0 \le t \le t_1 \\ -\dot{y}_{max}(2t_1 - t), & t_1 \le t \le t_2 \\ -\hat{y}_{mod}, & t \ge t_2 \end{cases} \quad (12)$$

Figure 9B:
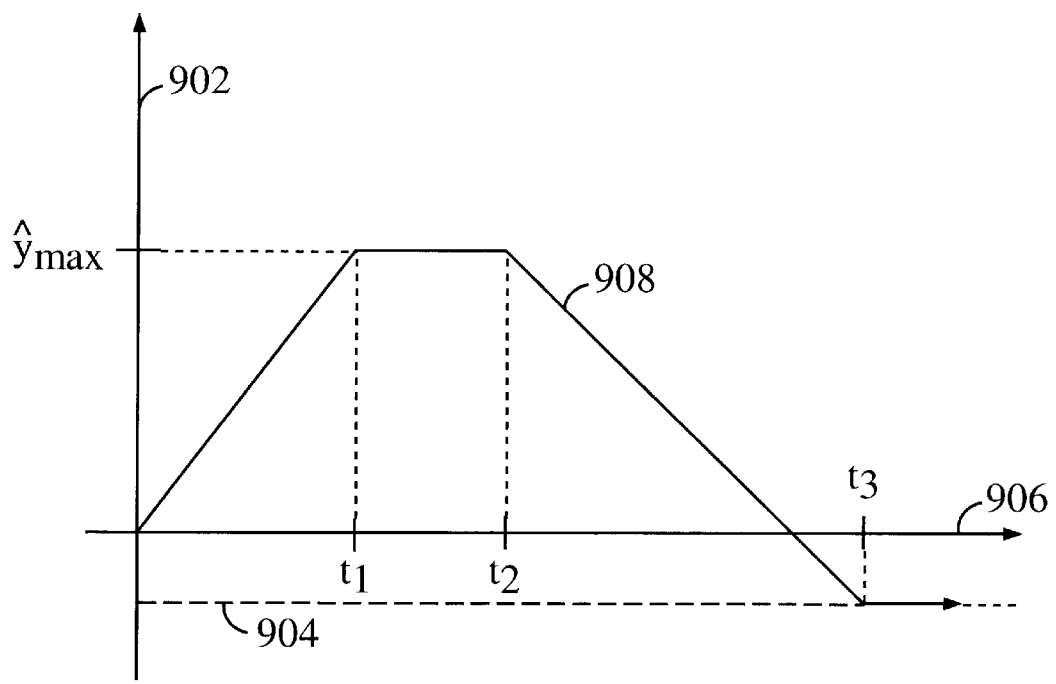

FIG. 9B represents the case of FIG. 9A, but where the slew rate is limited by a maximum slew rate $\dot{y}_{max}$. Referring to the race car analogy, the race car accelerates until time $t_1$, then travels at that speed until $t_2$, and then decelerates until time $t_3$. At time $t_3$, the race car and pace car are traveling at the same speed and are next to each other.

$$t_1 = \frac{|\hat{y}_{min}|}{\dot{y}_{max}} \quad (13)$$

$$t_2 = t_1 + \frac{\hat{x}_{RTD}\dot{y}_{max} + \left(\frac{1}{2}\hat{y}_{mod}^2 + 2\hat{y}_{mod}\hat{y}_{min} + \hat{y}_{min}^2\right)}{\dot{y}_{max}(\hat{y}_{min} + \hat{y}_{mod})} \quad (14)$$

$$t_3 = t_2 - \frac{\hat{y}_{min} + \hat{y}_{mod}}{\dot{y}_{max}} \quad (15)$$

$$\hat{y}_{slew}(t) = \begin{cases} -\dot{y}_{max}t, & 0 \le t \le t_1 \\ \hat{y}_{min}, & t_1 \le t \le t_2 \\ \hat{y}_{min} + \dot{y}_{max}(t-t_2), & t_2 \le t \le t_3 \\ -\hat{y}_{mod}, & t \ge t_3 \end{cases} \quad (16)$$

Figure 9C:
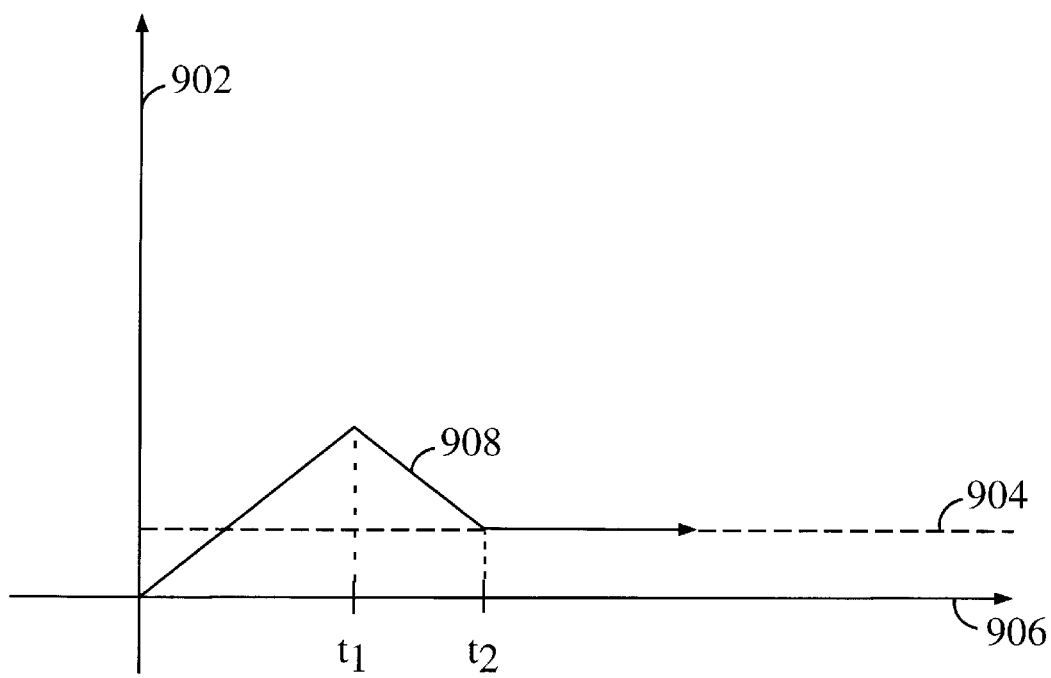

FIG. 9C presents a timing correction case where the original slew rate (the origin) is less than the desired final slew rate. As in FIG. 9A, the race car accelerates until time $t_1$, then decelerates until time $t_2$, when the gap is closed. Those break points are given by the following equations.

$$t_1 = \frac{1}{\dot{y}_{max}}\left(-\hat{y}_{mod} + \sqrt{\frac{\hat{y}_{mod}^2}{2} + \hat{x}_{RTD}\dot{y}_{max}}\right) \quad (17)$$

$$t_2 = 2t_1 + \frac{\hat{y}_{mod}}{\dot{y}_{max}} \quad (18)$$

$$\hat{y}_{slew}(t) = \begin{cases} \dot{y}_{max}t, & 0 \le t \le t_1 \\ \dot{y}_{max}(2t_1 - t), & t_1 \le t \le t_2 \\ -\hat{y}_{mod}, & t \ge t_2 \end{cases} \quad (19)$$

Note that the time correction is represented by the area between curve 908 and dashed line 904. Therefore, to achieve a positive time correction, the shaded area above dashed line 904 must exceed the shaded area below dashed line 904.

Figure 9D:
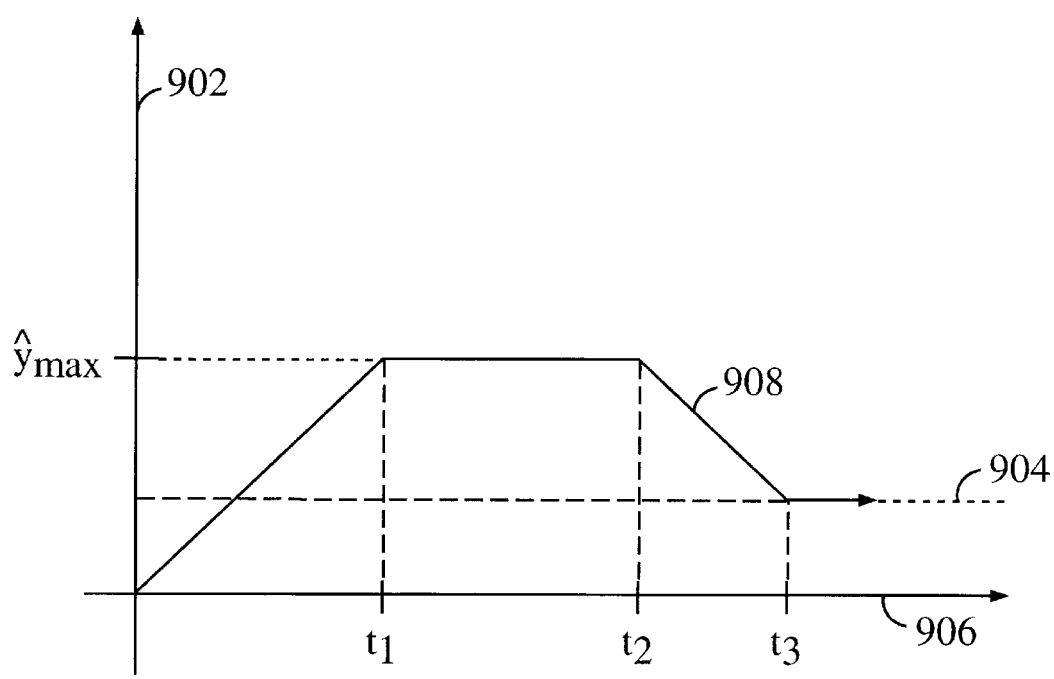

FIG. 9D presents the case of FIG. 9C, but where the maximum slew rate has been encountered. Therefore, as in FIG. 9B, curve 908 has three break points. Those break points are given by the following equations.

$$t_1 = \frac{\hat{y}_{max}}{\dot{y}_{max}} \quad (20)$$

$$t_2 = t_1 + \frac{\hat{x}_{RTD}\dot{y}_{max} + \left(\frac{1}{2}\hat{y}_{mod}^2 + 2\hat{y}_{mod}\hat{y}_{max} + \hat{y}_{max}^2\right)}{\dot{y}_{max}(\hat{y}_{max} + \hat{y}_{mod})} \quad (21)$$

$$t_3 = t_2 + \frac{\hat{y}_{max} + \hat{y}_{mod}}{\dot{y}_{max}} \quad (22)$$

$$\hat{y}_{slew}(t) = \begin{cases} \dot{y}_{max}t, & 0 \le t \le t_1 \\ \hat{y}_{max}, & t_1 \le t \le t_2 \\ \hat{y}_{max} - \dot{y}_{max}(t-t_2), & t_2 \le t \le t_3 \\ -\hat{y}_{min}, & t \ge t_3 \end{cases} \quad (23)$$

Figure 9E:
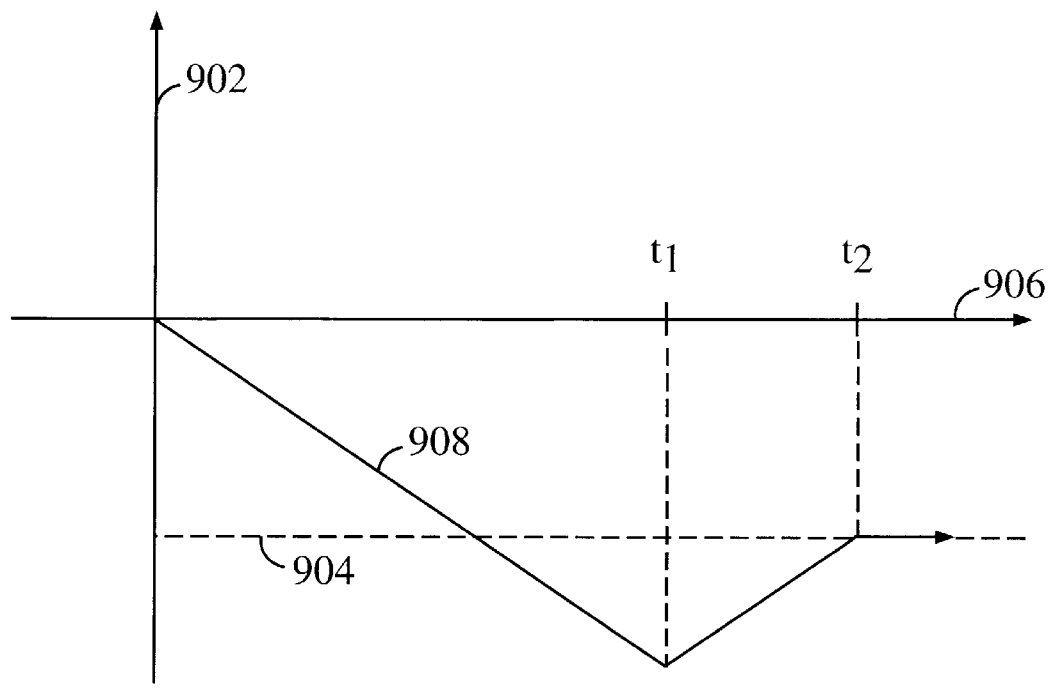

FIG. 9E presents a special case of FIG. 9A, where the slew rate is inadequate to bring the fractional frequency deviation of the user terminal clock to the final frequency deviation 904 without accumulating an excess of time error correction. In graphical terms, by the time curve 908 reaches line 904, the area between the two curves is too great. To compensate for this time correction, curve 908 must spend some time below curve 904. Thus, as in FIGS. 9C and 9D, the difference between the shaded areas above and below curve 904 represents the appropriate time correction factor. The break points for the case of FIG. 9E are calculated by the following equations.

$$t_1 = \frac{1}{\dot{y}_{max}}\left(-\hat{y}_{mod} + \sqrt{\frac{\hat{y}_{mod}^2}{2} - \hat{x}_{RTD}\dot{y}_{max}}\right) \quad (24)$$

$$t_2 = t_1 + \frac{1}{\dot{y}_{max}}\sqrt{\frac{\hat{y}_{mod}^2}{2} + \hat{x}_{RTD}\dot{y}_{max}} \quad (25)$$

$$\hat{y}_{slew}(t) = \begin{cases} \dot{y}_{max}t, & 0 \le t \le t_1 \\ \dot{y}_{max}(2t_1 - t), & t_1 \le t \le t_2 \\ -\hat{y}_{mod}, & t \le t_2 \end{cases} \quad (26)$$

Figure 9F:
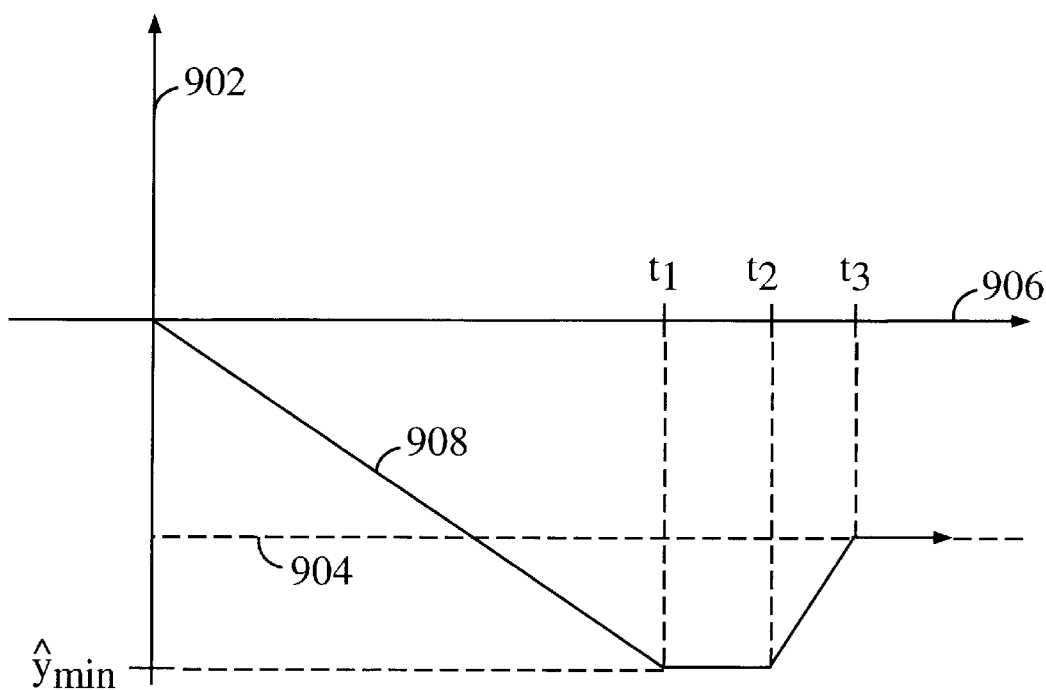

FIG. 9F represents the case of FIG. 9E, but where the slew rate is limited by a minimum slew rate $\hat{y}_{min}$. In a preferred embodiment, $\hat{y}_{max} = -\hat{y}_{min}$. Therefore, curve 908 has three breakpoints in FIG. 9F. These break points are computed using the following equations.

$$t_1 = \frac{\hat{y}_{max}}{\dot{y}_{max}} \quad (27)$$

$$t_2 = t_1 + \frac{\hat{x}_{RTD}\dot{y}_{max} - \left(\frac{1}{2}\hat{y}_{mod}^2 + 2\hat{y}_{mod}\hat{y}_{max} + \hat{y}_{max}^2\right)}{\dot{y}_{max}(\hat{y}_{max} + \hat{y}_{mod})} \quad (28)$$

$$t_3 = t_2 + \frac{\hat{y}_{max} + \hat{y}_{mod}}{\dot{y}_{max}} \quad (29)$$

$$\hat{y}_{slew}(t) = \begin{cases} \dot{y}_{max}t, & 0 \le t \le t_1 \\ \hat{y}_{max}, & t_1 \le t \le t_2 \\ \hat{y}_{max} - \dot{y}_{max}(t-t_2), & t_2 \le t \le t_3 \\ -\hat{y}_{mod}, & t \ge t_3 \end{cases} \quad (30)$$

Figure 10:
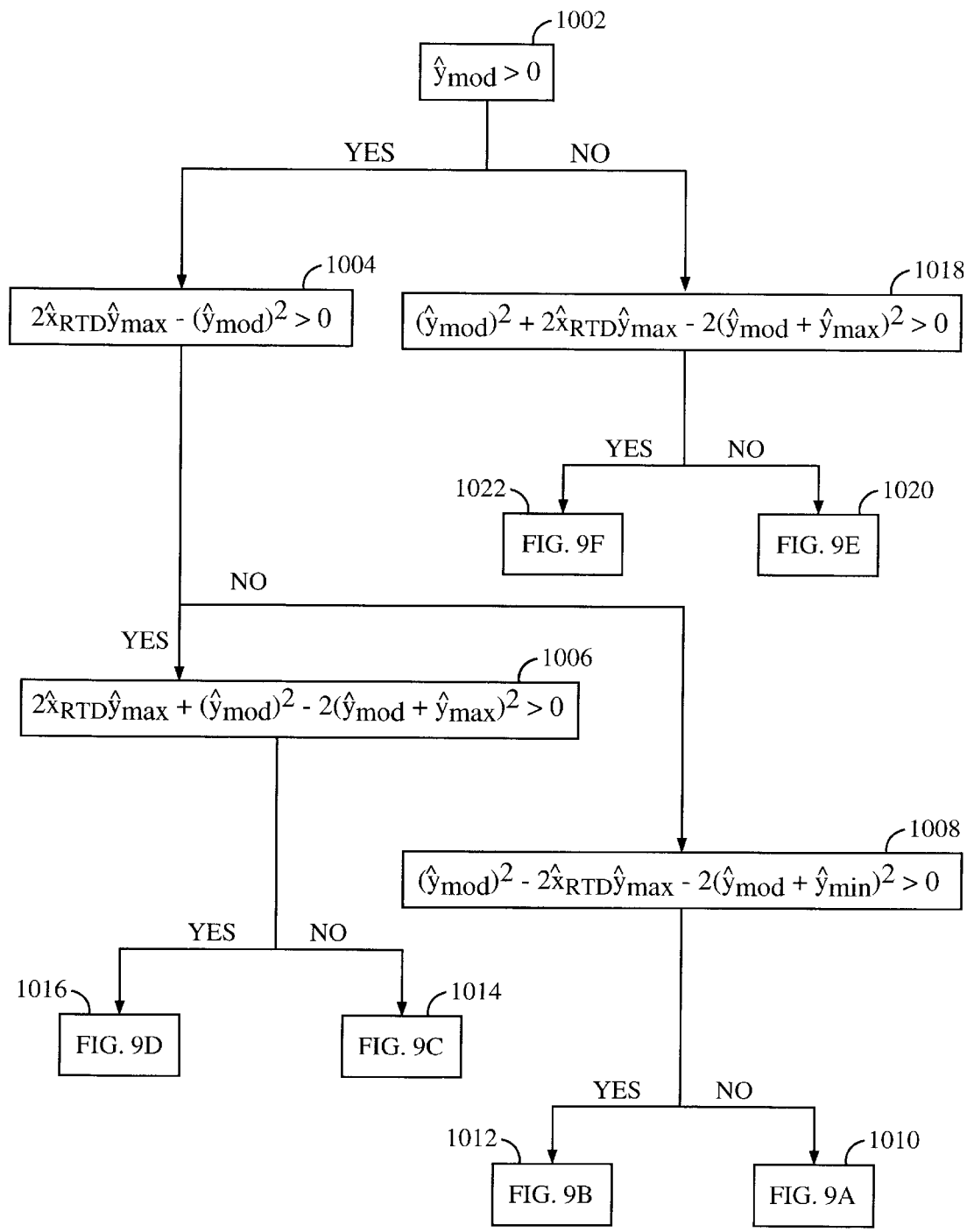
FIG. 10 depicts a decision tree used to select the proper one of the six timing correction cases.

In a preferred embodiment, the proper one of the six timing correction cases is selected using the decision tree shown in FIG. 10. The decision tree begins with a determination of whether the translated fractional frequency deviation $\hat{y}_{mod}$ is positive or negative, as shown in a step 1002. If $\hat{y}_{mod}$ is negative, then the scenario falls within the timing correction cases of FIGS. 9E–F. If $\hat{y}_{mod}$ is positive, then the scenario falls within the timing correction cases of FIGS. 9A–D.

If $\hat{y}_{mod}$ is positive, then the decision tree tests the equation $$2\hat{x}_{RTD}\dot{y}_{max} - (\hat{y}_{mod})^2 > 0 \quad (31)$$

as shown in a step 1004. If true, then the scenario falls within the timing correction cases of FIGS. 9C–D. If false, then the scenario falls within the timing correction cases of FIGS. 9A–B. If true, then the decision tree tests the equation $$2\hat{x}_{RTD}\hat{y}_{max}+(\hat{y}_{mod})^2-2(\hat{y}_{mod}+\hat{y}_{max})^2>0 \qquad (32)$$

as shown in a step 1006. If true, then the scenario falls within the timing correction case of FIG. 9D, as shown in a step 1016. If false, the scenario falls within the timing correction case of FIG. 9C, as shown in step 1014.

If in step 1004, equation 31 was found to be false, then the decision tree tests the equation $$(\hat{y}_{mod})^2-2\hat{x}_{RTD}\hat{y}_{max}-2(\hat{y}_{mod}+\hat{y}_{min})^2>0 \qquad (33)$$

as shown in a step 1008. If true, then the scenario falls within the timing correction case of FIG. 9B, as shown in a step 1012. If false, then the scenario falls within the timing correction case of FIG. 9A, as shown in the step 1010.

If in step 1002 $\hat{y}_{mod}$ was found to be negative, then the decision tree tests the equation $$(\hat{y}_{mod})^2+2\hat{x}_{RTD}\hat{y}_{max}-2(\hat{y}_{mod}+\hat{y}_{max})^2>0 \qquad (34)$$

as shown in a step 1018. If true, then the scenario falls within the timing correction case of FIG. 9F, as shown in step 1022. If false, then the scenario falls within the timing correction case of FIG. 9E, as shown in a step 1020.

When the proper timing correction case has been selected, the break points for that case are computed as discussed above. The break points are then provided to time correction controller 522, which provides time correction commands 524 to time generation unit 518.

Figure 11:
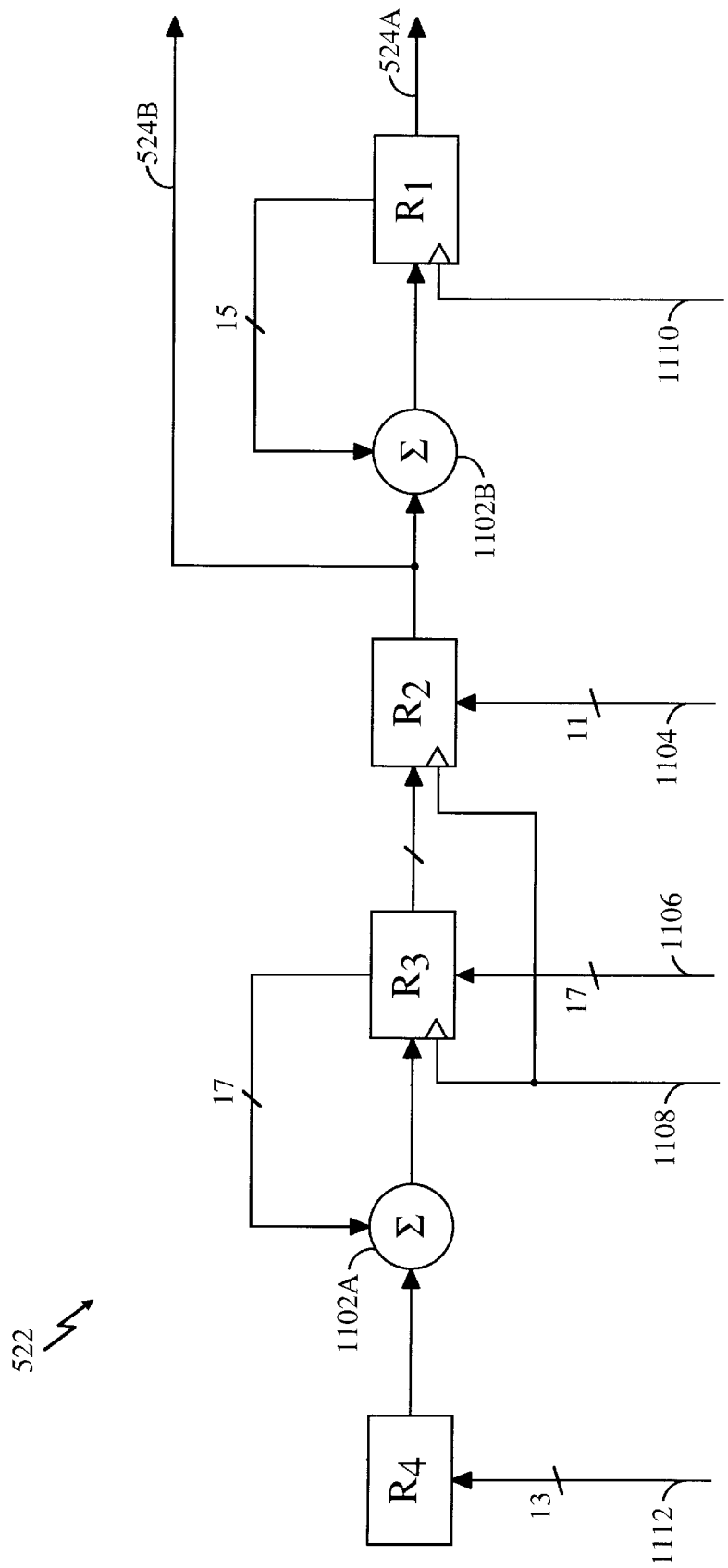
FIG. 11 is a circuit block diagram depicting a portion of a time correction controller according to a preferred embodiment of the present invention.

FIG. 11 is a circuit block diagram depicting a portion of time correction controller 522 according to a preferred embodiment of the present invention. Time correction controller 522 includes four registers $R_1$, $R_2$, $R_3$, and $R_4$. Time correction controller 522 also includes two summers 1102A, B.

Thus, time correction controller 522 includes two accumulators. One accumulator is formed by register $R_3$ and summer 1102A and the other accumulator is formed by register $R_1$ and summer 1102B. Registers $R_2$ and $R_3$ are clocked together. In a preferred embodiment, the clock rate is 1 hertz. Register $R_1$ receives a separate clock. In a preferred embodiment this clock rate is 19.2 kilohertz. In a preferred embodiment, registers $R_3$ and $R_4$ and summer 1102A are implemented in software, and registers $R_1$ and $R_2$ and summer 1102B are implemented in hardware.

In a preferred embodiment, time correction controller provides two time correction command signals 524A,B. Time correction signal 524B is a binary signal that directs time generation unit 518 to slew the user terminal clock frequency either positively or negatively. Time correction signal 524A is a binary signal that directs time control unit 518 to either slew or not slew the clock signal. These two signals are used in conjunction to command time generation unit 518 to one of three states: positive slew, negative slew, or no slew. in a preferred embodiment, time correction signal 524A is the "rollover" output of register $R_1$, and time correction signal 524B is the most significant bit of the count of register $R_2$.

In a preferred embodiment, time generation unit 518 produces an intermediate signal having a frequency that is eight times the chip rate of the satellite communications system, as described above. In nominal operation, time generation unit divides the frequency of this signal by eight to produce the user terminal clock signal. In a preferred embodiment, time generation unit 518 responds to time correction signals 524A,B by selecting other divisors. For example, when time generation unit 518 receives a command to slew positively, it selects a divisor of seven or less, resulting in a user terminal clock signal of a higher frequency than nominal. Conversely, when time generation unit 518 receives a command to slew negatively, it selects a divisor of nine or more, resulting in a user terminal clock signal of a lower frequency than nominal. Other methods can be employed to adjust the frequency of the user terminal clock signal without departing from the spirit and scope of the present invention, as would be apparent to one skilled in the relevant art.

Referring to FIG. 11, registers $R_2$ and $R_3$ are initialized to zero and register $R_4$ is loaded with an initial slew rate when the time correction procedure begins. The time correction procedure typically begins when the user terminal is initially powered. Register $R_4$ is subsequently loaded with a predetermined slew rate at the break point times calculated for the selected time correction case.

VII. Conclusion

The previous description of the preferred embodiments is provided to enable any person skilled in the art to make or use the present invention. While the invention has been particularly shown and described with reference to preferred embodiments thereof, it will be understood by those skilled in the art that various changes in form and details may be made therein without departing from the spirit and scope of the invention.

What is claimed is:

1. In a communications system including a gateway, a satellite with a known position and known velocity, and a user terminal having a deskew buffer clocked by a user terminal clock, a system for determining the accumulated error in the user terminal clock over a predetermined period, the system comprising:

means for computing the one-way signal delay between the satellite and the user terminal based on a round-trip signal delay for signals sent from the gateway to the user terminal and back to the gateway, an actual deskew buffer delay imposed by the deskew buffer on the signals received by the user terminal, and the known position and known velocity of the satellite;

means for computing a desired deskew buffer delay based on said one-way signal delay and a predetermined maximum value of said one-way signal delay; and means for computing the accumulated error in the user terminal clock based on said desired deskew buffer delay and said actual deskew buffer delay.

2. The system of claim 1, further comprising:
   means for measuring said round-trip signal delay.

3. The system of claim 1, further comprising:
   means for measuring said actual deskew buffer delay.

4. The system of claim 1, wherein:
   said predetermined maximum value of said one-way signal delay is the maximum possible one-way signal delay between the satellite and the user terminal.

5. The system of claim 1, wherein:
   said predetermined maximum value of said one-way signal delay equals the sum of the maximum possible one-way signal delay between the satellite and the user terminal and a time offset to compensate for the maximum possible accumulated error of the user terminal clock.

6. The system of claim 1, wherein:
   said desired deskew buffer delay equals the difference between said one-way signal delay and said predetermined maximum value of said one-way signal delay.

7. The system of claim 1, further comprising:

means for computing said actual deskew buffer delay based on the number of storage locations intervening between the deskew buffer write pointer and the deskew buffer read pointer and at least one of the deskew buffer write interval and the deskew buffer read interval.

8. In a communications system including a gateway, a satellite with a known position and known velocity, and a user terminal having a deskew buffer clocked by a user terminal clock, a method for determining the accumulated error in the user terminal clock over a predetermined period, the method comprising the steps of:

computing the one-way signal delay between the satellite and the user terminal based on a round-trip signal delay for signals sent from the gateway to the user terminal and back to the gateway, an actual deskew buffer delay imposed by the deskew buffer on the signals received by the user terminal, and the known position and known velocity of the satellite;

computing a desired deskew buffer delay based on said one-way signal delay and a predetermined maximum value of said one-way signal delay; and computing the accumulated error in the user terminal clock based on said desired deskew buffer delay and said actual deskew buffer delay.

9. The method of claim 8, further comprising the step of:

measuring said round-trip signal delay.

10. The method of claim 8, further comprising the step of:

measuring said actual deskew buffer delay.

11. The method of claim 8, further comprising the step of:

selecting said predetermined maximum value of said one-way signal delay as the maximum possible one-way signal delay between the satellite and the user terminal.

12. The method of claim 8, further comprising the step of:

selecting said predetermined maximum value of said one-way signal delay to equal the sum of the maximum possible one-way signal delay between the satellite and the user terminal and a time offset to compensate for the maximum possible accumulated error of the user terminal clock.

13. The method of claim 8, further comprising the step of:

selecting said desired deskew buffer delay to equal the difference between said one-way signal delay and said predetermined maximum value of said one-way signal delay.

14. The method of claim 8, further comprising the step of:

computing said actual deskew buffer delay based on the number of storage locations intervening between the deskew buffer write pointer and the deskew buffer read pointer and at least one of the deskew buffer write interval and the deskew buffer read interval.

\* \* \* \* \*